Dec. 20, 1966    E. E. V. VON BHICKNAPAHARI    3,293,389
VALVES FOR HYDRAULIC SYSTEMS
Filed Jan. 27, 1964

INVENTOR.
Erika Elfriede Verena Von Bhicknapahari
BY
*ATTORNEYS*

United States Patent Office 3,293,389
Patented Dec. 20, 1966

3,293,389
VALVES FOR HYDRAULIC SYSTEMS
Erika Elfriede Verena von Bhicknapahari,
Aemtlerstrasse 30, Zurich, Switzerland
Filed Jan. 27, 1964, Ser. No. 340,147
1 Claim. (Cl. 200—81.9)

The present invention relates to hydraulic systems, and in particular to valves which act as safety devices, by isolating a part of the system which develops a leak. These valves are intended to be connected between the power chamber, e.g. master cylinder, power generating motor, etc., and the operative part.

The present invention provides a valve for hydraulic systems comprising a chamber having an inlet for connection to a power chamber, and an outlet for connection to the operative part, and a flap valve which is mounted for movement within the chamber from an open position in which it is normally retained, and in which hydraulic fluid may flow between the inlet and outlet, to a closed position, in which hydraulic fluid is prevented from flowing between the inlet and outlet, when the force exerted on the flap valve by the flow of hydraulic fluid between the inlet and outlet exceeds a predetermined value, means being provided for retaining the flap valve in the closed position.

When there is no leak in the system, the flow of hydraulic fluid between the inlet and outlet around the flap valve, which takes place when pressure is applied, is not sufficient to move the flap valve to its closed position. However, when a leak develops on the side of the valve remote from the power chamber, the flow of hydraulic fluid from the inlet to the outlet is increased and moves the flap valve to the closed position; the retaining means prevents the flap valve from returning to the open position when the application of pressure is stopped.

Figure 1:
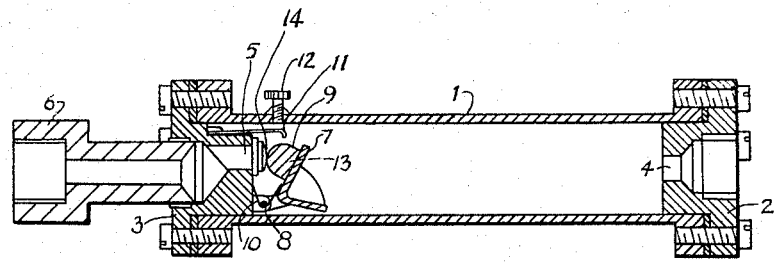
Figure 4:
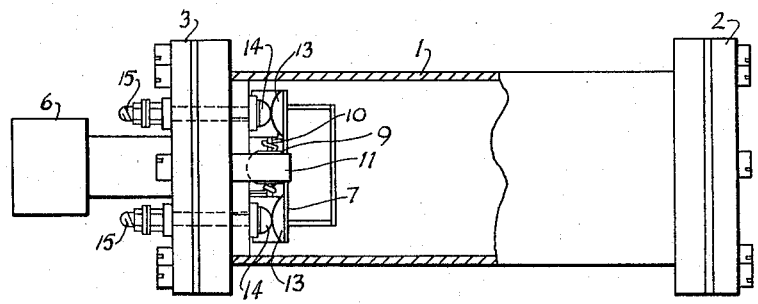
Figure 2:
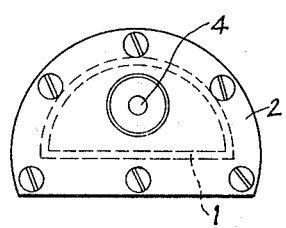
Figure 3:
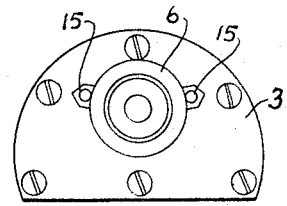

In order that the invention may be more clearly understood, reference will now be made to the accompanying drawing, in which:

FIGURE 1 is a longitudinal section through one embodiment of a valve device according to this invention;
FIGURE 2 is an end view of FIGURE 1 from the inlet end;
FIGURE 3 is an end view from the outlet end; and
FIGURE 4 is a plan view of FIGURE 1, partly cut away.

Referring to the drawing, the valve comprises a chamber 1 which is preferably D-shaped in cross-section and is closed at each end by an end wall 2 and 3. One of the end walls 2 is provided with an inlet 4 which is connected to the pressure chamber (not shown) of a hydraulic system, and the other of the end walls 3 is provided with an outlet 5 which is connected to the pipe 6 leading to the operative part (not shown).

Within the chamber 1, extending thereacross between the inlet and outlet, is a D-shaped flap valve 7. The straight edge of this flap valve is connected by a hinge 8 to the end wall 3 thereof, in which the outlet 5 is provided. The flap valve 7 may rock about the hinge 8 from an open position in which it is inclined towards the inlet, to a closed position in which it seals the outlet. Sealing means 9 may be provided on the valve to seal against the outlet to ensure that a liquid tight seal is formed between the outlet and the flap valve when the latter is in the closed position.

A spring 10 is provided for normally urging the flap valve towards the open position. This spring is of such a strength that it is able to resist the force exerted on the flap valve 7 by the flow of hydraulic fluid therearound when there are no leaks on the outlet side of the valve and the pressure is applied, but is unable to resist the force exerted by the increased flow of hydraulic fluid on the flap valve when a leak develops.

Projecting into the chamber 1 adjacent the outlet 5 and opposite the internal flat wall of the chamber is a retaining means 11 in the form of a spring pressed latch which is arranged to allow the flap valve 7 to move from the open position to the closed position, but to prevent the flap valve, when in the closed position, from returning to the open position. The latch is manually releasable, for example by undoing a screw 12 in a hole in the chamber opposite the latch and lifting the latch by a member inserted through the screw hole, to enable the flap valve to return from the closed position to the open position under the action of its spring. The latch may comprise a leaf spring having its end bent downwards to engage the flap valve.

A switch may be provided which is operable by the flap valve to give warning within the vehicle when the flap valve moves to the closed position. The switch may take the form of contacts 13, 14 provided on the flap valve and the end wall in which the outlet is provided, which are closed when the flap is in its closed position. The closing of these contacts may complete a warning light circuit connected to the terminal 15, the bulb of which may be mounted on the instrument panel.

Since the valves are connected between the power chamber and the various operative parts, any leak occurring to any one of the operative parts will not in any way affect the full efficiency of the other operative parts of the same hydraulic system; e.g. in a car fitted with two valves, each between the master cylinder and the brake cylinders of one pair of wheels, i.e. the front or rear wheels, the brakes of both the rear wheels will, in case of a leak in the front wheel cylinders or the pipes leading towards them, still function, or vice-versa, if the rear wheel brakes fail, they will be isolated and the front wheel brakes will still function.

It will be understood that various modifications may be made without departing from the scope of the present invention. For example, means may be provided for retaining the flap valve in its open position when the hydraulic system is being initially filled with hydraulic fluid or when the system is bled from time to time to remove air therefrom.

What is claimed is:

A valve device for hydraulic systems, said device comprising first means for connection to a source of hydraulic fluid under pressure, second means for connection to utilization apparatus operated by hydraulic fluid; a chamber connecting said first means to said second means and sealed fluid-tight to both of said means, said second means comprising a channel with an entrance facing said chamber; a flap valve within said chamber, mounted for movement between an open position in which fluid can flow from said first means through said second means and a closed position in which said fluid is prevented from flowing through said second means, said valve comprising a closing member seating in said entrance of said channel; a spring bearing against said valve and one wall of said chamber to retain said flap valve in its open position against normal fluid flow through said chamber, said spring having a calibrated force of a predetermined amount permitting said flap valve to close when the rate of said fluid flow exceeds a predetermined value; a resilient spring within said chamber and having a free end with a hook thereon for holding said flap valve in closed position after said valve has moved to such position; and electrical contact means within said chamber engaged by said valve to indicate when said valve is in closed position.

(References on following page)

References Cited by the Examiner

UNITED STATES PATENTS

| | | | |
|---|---|---|---|
| 1,098,670 | 6/1914 | Leinss | 137—465 X |
| 1,518,461 | 12/1924 | Smith | 137—460 |
| 1,840,180 | 1/1932 | Woods | 137—459 |
| 2,821,995 | 2/1958 | Semler | 137—460 |
| 2,965,730 | 12/1960 | Regoli | 137—460 X |

FOREIGN PATENTS

| | | |
|---|---|---|
| 399,416 | 8/1924 | Germany. |
| 588,807 | 11/1933 | Germany. |

WILLIAM F. O'DEA, *Primary Examiner.*

HAROLD WEAKLEY, *Examiner.*